E. DE LAS H. MOLINA & L. B. ALCANTARILLA.
WHEEL FOR AUTOMOBILES.
APPLICATION FILED JAN. 19, 1918.
1,284,954.
Patented Nov. 12, 1918.
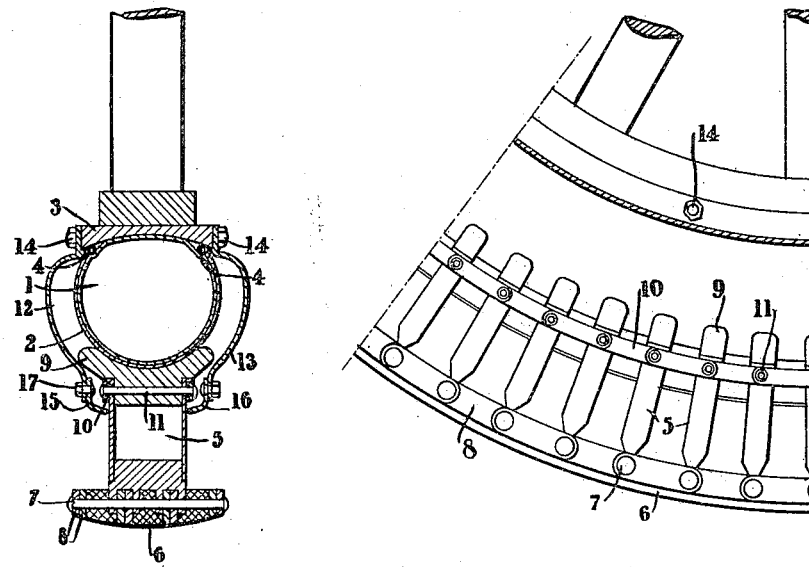
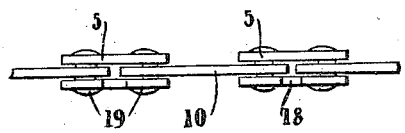
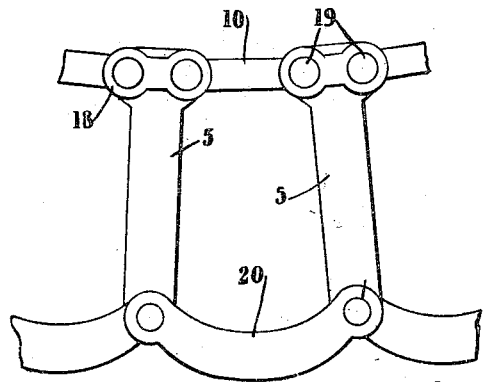
Inventors
Eugenio de las Heras Molina
Luis Bonet Alcantarilla
by
W. E. Evans
Attorney.

UNITED STATES PATENT OFFICE.

EUGENIO DE LAS HERAS MOLINA AND LUIS BONET ALCANTARILLA, OF JAEN, SPAIN.

WHEEL FOR AUTOMOBILES.

1,284,954.     Specification of Letters Patent.     Patented Nov. 12, 1918.

Application filed January 19, 1918. Serial No. 212,812.

*To all whom it may concern:*

Be it known that we, EUGENIO DE LAS HERAS MOLINA and LUIS BONET ALCANTARILLA, subjects of the King of Spain, residing, respectively, at 1 Rue Martinez Molina, Jaen, Spain, and 11 Rue Ruiz Romero, Jaen, Spain, have invented certain new and useful Improvements Relating to Wheels for Automobiles, of which the following is a specification.

This invention has for its object to provide an elastic wheel for automobiles in the use of pneumatic tubes but with the advantage that the air chambers and the covers therefor are preserved from wear, puncture, and from other accidents that are met with by reason of the pneumatic tire making direct contact with the road.

According to the invention two articulated chains are provided around the wheel, the outer chain forming a tread crown upon the wheel while the inner chain serves to connect a succession of radial members or struts more or less separated and articulated to the tread crown, these struts being applied upon the air chamber or tube or upon its flexible cover so that the movements imparted to the tread crown on the rotation of the wheel as the result of inequalities on the road surface are transferred to the radial members or struts aforesaid so that they are thus absorbed without transmission to the wheel axle.

The accompanying drawing represents a constructional form of the invention and a modification.

Figure 1 is a partial cross sectional view taken in a diametrical plane.

Fig. 2 is a partial lateral view of the portion of the wheel illustrated in Fig. 1.

Figs. 3 and 4 represent a modification.

In carrying the invention into effect as illustrated in Figs. 1 and 2 of the accompanying drawings, the air tube or chamber 1 is mounted upon the rigid felly 3 of the wheel by means of the outer cover 2 having two wires mounted in the circumferential edges of the outer cover in known manner.

The radial members or struts 5 are articulated to the tread crown 6 by means of bolts 7 which serve at the same time as axes of articulation for the members or links 8 forming the said tread crown 6.

It will be understood that the tread crown is formed in the manner of a chain of which the links are constituted by a number of alternate pieces 8 articulated to each other at 7 and articulated besides to the radial members 5 by which the deformations of the tread crown 6 are transferred to the air tube or chamber in the manner before described. In order that this effect may be conveniently produced without deterioration of the outer cover 2 the radial members 5 terminate at the ends at which they contact with the outer cover or protector with heads 9 having a hollow section.

The radial members 5 are articulated together at the one end by the same links 8 of the tread crown and at the other end by a number of alternate links 10 connected by the bolts 11.

The air chamber or tube 1 and the heads 9 of the radial members 5 are mounted in the interior of a protecting chamber made of metal sheet and formed of circles or rings 12 and 13 terminating at the inner edge by a flat edge fixed by bolts 14 to the rigid felly 3 and having on the exterior periphery another flat part to which are respectively fixed the annular members or rings 15, 16 by means of bolts such as 17 and as will be seen from Fig. 1 the circles or rings 12, 13, 15 and 16 form the chamber of protection with rigid walls within which the pneumatic tube or chamber 1 and the heads 9 of the radial members 5 are mounted. These latter penetrate into the protecting chamber traversing with a free movement the space which results between the annular members or rings 15 and 16. The heads 9 by reason of their size cannot pass through the said space so that thus the retention or connection of the whole of the arrangement of the wheel is assured as is the case when the air chamber is deflated.

It will thus be understood that the stresses imposed upon the tread crown 6 are transferred directly by means of the radial members 5 to the pneumatic tube or chamber 1 and that the latter is protected on all sides.

According to the modification illustrated in Figs. 3 and 4, the member connecting the heads 9 to the radial members 5 is formed independently at each side by links constituted by an extension of the extremities of the radial members 5 and by a link 18 articulated by means of bolt 19 to links 10, the latter being disposed in alinement. The straight links 8 are replaced by the curved links 20.

We claim:

1. Wheels for automobiles, consisting in combination of two articulated circular chains around the wheel rim of which the outer chain forms the tread crown and the inner chain serves to connect a number of radial members articulated also to the tread crown, the said radial members comprising parts making contact with the air tube or with the outer cover surrounding the latter, substantially as described.

2. Wheels for automobiles, consisting in combination of two articulated circular chains around the wheel rim of which the outer chain forms the tread crown and the inner chain serves to connect a number of radial members articulated also to the tread crown, the said radial members comprising parts making contact with the air tube or with the outer cover surrounding the latter, and means for the protection of the air tube and outer cover and the upper parts of said radial members, substantially as described.

3. Wheels for automobiles, consisting in combination of two articulated circular chains around the wheel rim of which the outer chain forms the tread crown and the inner chain serves to connect a number of radial members articulated also to the tread crown, the upper ends of the said radial members making contact with the air tube or with the outer cover surrounding the latter, the said radial members being constituted of struts having their inner ends provided with an integral transverse link member, substantially as described.

EUGENIO DE LAS HERAS MOLINA.
LUIS BONET ALCANTARILLA.

Witnesses:
ELY E. PALMER,
ERNEST E. EVANS.

Copies of this patent may be obtained for five cents each, by addressing the "Commissioner of Patents, Washington, D. C."